July 22, 1969      J. ZEMANEK, JR      3,456,754

TRANSMISSION CIRCUITS FOR WELL LOGGING SYSTEMS

Filed Sept. 3, 1957      4 Sheets-Sheet 1

July 22, 1969　　　　J. ZEMANEK, JR　　　　3,456,754
TRANSMISSION CIRCUITS FOR WELL LOGGING SYSTEMS
Filed Sept. 3, 1957　　　　　　　　　　　　4 Sheets-Sheet 2

United States Patent Office 3,456,754
Patented July 22, 1969

3,456,754
TRANSMISSION CIRCUITS FOR WELL LOGGING SYSTEMS
Joseph Zemanek, Jr., Dallas, Tex., assignor, by mesne assignments, to Socony Mobil Oil Company, Inc., New York, N.Y., a corporation of New York
Filed Sept. 3, 1957, Ser. No. 681,522
Int. Cl. G10k 11/00; H01b 11/06
U.S. Cl. 181—.5                                    18 Claims This invention relates to well logging systems and more particularly to improvements in transmission circuits for transmitting electrical signals from downhole detectors or receivers to uphole recording equipment and has for an object transmission circuits which overcome the effects of crosstalk in well logging systems.

In typical well logging sytems, electrical signals representative of substrata characteristics adjacent a well bore are transmitted from detectors or transducers over transmission lines to uphole recording equipment. Because the logging cable available today does not include adequate shielding of the individual conductors comprising the cable, there is introduced, as between the conductors of the cable, a significant amount of crossfeed or crosstalk. The crosstalk signals are usually of sufficient magnitude to produce false operation of the recording equipment, mask the true character of the signals produced at the detectors, and thus cause erroneous information regarding the character of the strata under investigation. This problem is particularly troublesome in well logging systems embodying more than one detector where the information to be derived is the time interval between signals generated by the detectors. While solutions to the crosstalk problem are available in the art, such solutions employ downhole switching operations in which the detectors are alternately connected to a common transmission line. In accordance with the present invention, the problem of crosstalk is overcome without need of any downhole switching.

While the present invention is applicable to all forms of well logging at least two spaced detectors, it is particularly well suited to continuous velocity well logging systems. The present invention renders the spacing between the receivers independent of time delays introduced by switching to permit closer spacing between the receivers than heretofore realized in the art. Such closer spacing makes possible a more detailed log of the substrata characteristics.

In accordance with the present invention, there is provided in an acoustic velocity well logging system having a downhole transmitter and two receivers and a time interval measuring means uphole for measuring the time elapsed between the receipt of a transmitter-generated acoustic pulse by the first receiver and the receipt of the same pulse by the second receiver, a transmission line for transmitting electrical signals from the receivers to the measuring means. At the uphole end of the transmission line circuitry is provided to delete, or block, the transmitter pulses from the output and for applying two receiver pulses to the output which is coupled to the measuring means.

In one embodiment of the invention, a limiter is connected in circuit between a first of the receivers and the downhole end of the transmission line for limiting the magnitude of the signal applied to the transmission line by the first receiver. An amplifying means is connected in circuit between the second receiver and the downhole end of the transmission line for increasing the signal from the second receiver to a level substantially above that of the limited level of the first receiver. An amplitude selective means uphole selectively applies the signals from the first and second receivers to the time interval measuring means.

In accordance with another embodiment of the present invention, there is provided in a wall logging system having a transmitter and at least two detectors, a transmission line for transmitting electric signals from the detectors to the surface with negligible crossfeed. The transmission line comprises a cable having a plurality of conductors forming first and second circuits between the detectors and the uphole equipment. A limiter is connected in circuit between the first detectors and the downhole end of the first circuit to limit the magnitude of signal transmitted from the first detector over the first circuit to thereby reduce the magnitude of signal crossfed into the second circuit. An amplifier is provided in circuit between the second detector and the downhole end of the second circuit to increase the signal from the second detector to a level substantially greater than the signal crossfed from the first circuit.

In accordance with yet another embodiment of the present invention at least two of the conductors form a first circuit balanced to ground for connection to one of the detectors. At least one other of the conductors comprises a second circuit in parallel to ground for connection to another of the detectors. The signals induced from the second circuit are canceled in the first circuit and the signals induced from the first circuit are canceled in the second circuit due to the nonsymmetric connctions of the circuits with respect to ground.

More particularly, the first circuit is comprised of a loop formed by a pair of impedances and a pair of conductors alternately connected in series. The impedances are center-tapped to ground. The second circuit includes a second pair of impedances and at least another of the conductors. Each of the second pair of impedances has one end connected to ground. At a point remote from the grounded end, each of the second pair of impedances is connected to the other of the conductors.

For other objects and advantages of the present invention reference will be had to the following detailed description together with the accompanying drawings in which.

Figures 1, 2:
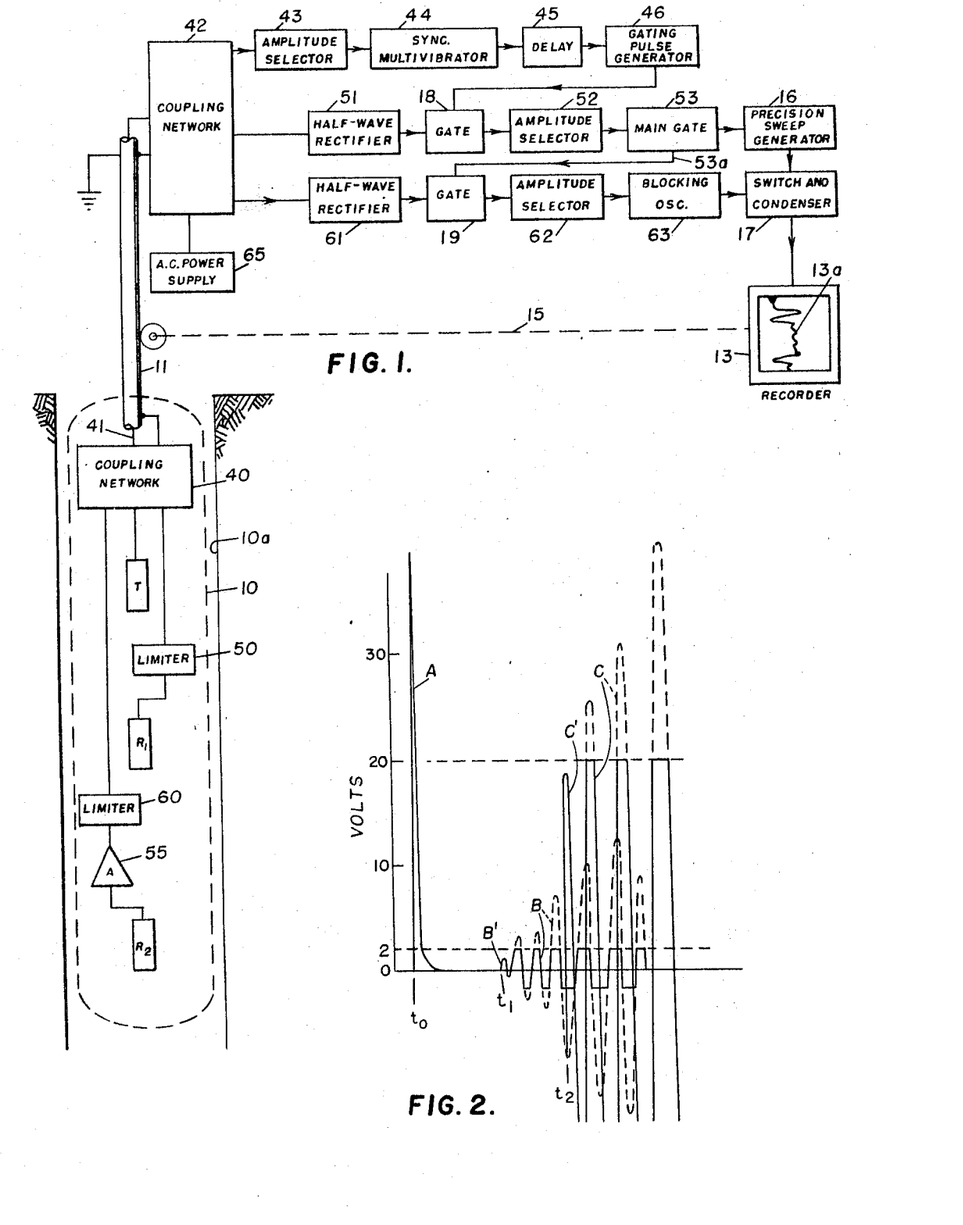
FIG. 1 schematically illustrates a continuous velocity logging system employing the present invention.
FIG. 2 is an explanatory figure illustrating detector waveforms.

Referring now to FIG. 1, there is disclosed a well logging system of the continuous velocity type in which a transmitter T and receivers R1 and R2 comprising a well logging tool 10 are positioned within a borehole 10a. The transmitter T and receivers R1, R2 are normally maintained in a fixed spaced relation one from another and supported as a unit by way of any suitable means, preferably a transmission line or cable 11 electrically connecting the transmitter and receivers to surface or uphole measuring and recording equipment.

The transmitter T may be of any suitable type, of which there are several well-known to those skilled in the art, for producing a series of spaced pulses of acoustic energy. The pulses of acoustic energy travel through the earth strata adjacent the transmitter to be received in sequence by the receivers R1 and R2 in the determination of the velocity characteristic of earth strata adjacent the borehole.

The velocity characteristic can be determined by measuring the time that it takes for acoustic energy to travel a known distance between one point in the earth strata and a second point. Hence, in the two-receiver systems, the velocity characteristic is represented by the time interval which elapses between the reception of the acoustic pulse at the first receiver R1 and the reception of the same acoustic pulse at the second receiver R2. The receivers R1 and R2 produce electric signals in response to the arrival of the acoustic pulse generated by the transmitter T. The electrical signals are transmitted uphole over the cable 11 to effect the operation of a timing means which measures the interval of time elapsed between the generation of the electrical signals by the receivers R1 and R2.

Where the timing device produces an electrical signal whose magnitude is representative of the elapsed time interval, such signal may be applied to a suitable recorder 13 for production on a chart thereof of a mark, the position of which is representative of the magnitude of the time interval. A plurality of such marks taken at varying depths along the borehole 10a will result in a graph, for example, the line 13a, which will be a log representative of the velocity characteristic of earth strata adjacent the borehole. The chart of the recorder 13 is driven as by way of mechanical connection 15 so as to provide a correlation of the measured velocity of an earth formation and depth of the particular earth formation.

It is difficult to realize the production of accurate velocity logs through utilization of two-receiver systems by reason of crossfeed or crosstalk introduced within the transmission cables. The crossfeed introduces ambiguities in the production of a velocity log by reason of the cables conventionally used by service companies not being provided with sufficient insulating and shielding characteristics to prevent a signal from one receiver from being introduced into conductors associated with the other receiver. The effect of crosstalk will be readily appreciated when it is considered that the timing system is responsive to pulses generated by the receivers and that the crosstalk signal fed from the conductors associated with the first receiver into the conductors of the second receiver may be effective to operate the timing system prior to the generation of the desired signal by the second receiver. In accordance with one aspect of the present invention, the effect of crossfeed is overcome by limiting the level of the signal applied from the first receiver to the transmission line, amplifying the output of the second receiver to a level greater than the level of the first receiver, and rendering the time interval measuring device amplitude selective.

For a better understanding of the present invention, reference will be made during the following description to the waveforms illustrated in FIG. 2. While the present invention is useful with many forms of time interval measuring systems, it is shown employed in a system of the type in which the uphole timing means in one form comprises a precision sweep generator 16 whose operation is begun in response to an electrical signal from the first receiver R1. The precision sweep generator may be of the type shown in U.S. Patent 2,704,364 to Gerald C. Summers in which the output signal is a monotonic function. Upon the generation of a signal from the second receiver R2, the magnitude of the signal from the precision sweep generator is sampled by a switch and condenser unit 17. The unit 17 is also shown in the aforementioned patent. The magnitude of the signal, representative of the interval velocity, i.e., the time it takes for an acoustic pulse to travel through the earth formation from a point adjacent the first receiver to a point adjacent the second receiver, is recorded as a point comprising the log or line 13a of the recorder 13.

In order to avoid operation of the system in response to noise signals, the precision sweep generator 16 and switch and condenser unit 17 are normally maintained nonresponsive, respectively, by gates 18 and 19. The system is conditioned for measurement of the time interval by means responsive to the production of an acoustic pulse from the transmitter T.

When the transmitter T produces an acoustic pulse, there is simultaneously produced a high frequency synchronizing pulse A (FIG. 2) of very large magnitude. This pulse is applied by way of coupling network 40, conductor 41 of the cable 11, and coupling network 42 to open the gate 18 and condition the precision sweep generator for response to a signal from the first receiver R1. More particularly, the synchronizing pulse passes through an amplitude selector 43, which is provided to assure that the system will respond only to signals above a predetermined value and will be nonresponsive to noise signals, to operate a pulse generator 44 of the monostable multivibrator type. The output of the multivibrator is delayed a predetermined period of time by delay network 45 and is then applied to a gating pulse generator 46 whose output is effective to open the gate 18.

The delay provided by the delay network 45 is of sufficient duration to assure that the synchronizing signal A (FIG. 2) will have been sufficiently attenuated so that upon opening of the gate 18 there will not result a false triggering of the precision sweep generator 16 in response to the synchronizing pulse A.

Now at time $t_1$ an electrical signal represented by the waveform B is generated by the receiver R1. The waveform B is of high frequency, for example, 15 kc. The precision sweep generator responds to a selected pulse of the waveform B, for example, the pulse B', to initiate the timing cycle. More particularly, the pulse B' is applied by way of limiter 50, the coupling network 40, conductor 41 of the cable 11, and thence to the coupling network 42. The pulse B' is then passed by way of half-wave rectifier 51 through the gate 18 and amplitude selector 52 to trigger a main gate 53 which may also be of the multivibrator type and preferably a monostable multivibrator. The output pulse from the main gate 53 is applied to energize the precision sweep generator. Simultaneously, a second pulse from the main gate 53 is applied by way of conductor 53a to open the gate 19 to condition the switch and condenser unit 17 for operation upon the generation of an electrical signal from the second receiver R2.

When the acoustic pulse from the transmitter T is received by the second receiver R2, there is generated a waveform as represented by a waveform C of FIG. 2. This waveform, also of high frequency like waveform B, is applied by way of amplifier 55 and limiter 60 to the coupling network 40 and thence by way of conductor 41 to the coupling network 42. The waveform is then rectified by the half-wave rectifier 61 and passes through the gate 19 and an amplitude selector 62 to a blocking oscillator 63. The blocking oscillator 63 responds to selected pulse of the waveform C, for example, the pulse C', to produce an output signal which is effective to initiate the operation of the switch and condenser unit 17.

The transmitter T is energized from a source of power 65 which may, as shown, be at the surface of the earth and is connected to the transmitter by way of the coupling network 42, conductor 41, and coupling network 40.

In accordance with the present invention, the time interval measuring system is made independent of the effects of crossfeed even where the crossfeed is as high as 100 percent, as is the case where a single conductor cable is employed. This operation is effected by clipping or limiting the output signals from the receivers at a predetermined level and rendering the time interval measuring system amplitude selective.

More particularly, the synchronizing signal or pulse A (FIG. 2) from the transmitter T is made to have a very large value. For example, as mentioned above, the pulse is greater than 20 volts and usually greater than 30 volts. These values are, of course, given as representative of one embodiment, and it will be understood that these values and the other values of signal level are given merely for purposes of illustration and are not to be considered as limiting. The amplitude selector 43 associated with the transmitter pulse A is adjusted so that only signal levels above a predetermined value, for example, 30 volts, will be passed by the amplitude selector to condition the system for response to signals from the first and the second receivers.

The output signal or waveform B from the first receiver R1 is limited to a predetermined value, for example, 2 volts, by the action of the limiter 50. The limiter may be of the type described in Ultra High Frequency Techniques by Brainerd et al. at pages 178, 179. As shown in FIG. 2, the character of the signals from the receivers is such that the later pulses of waveform B are of a value substantially greater than the onset or first pulse B'. Therefore, in the absence of the limiting action of the limiter 50, these later produced pulses may be of sufficient magnitude to produce a false operation of the system. By limiting the output from the first receiver to a value of 2 volts, the signal applied from the coupling network 42 will be blocked by the amplitude selector 43 and likewise blocked by the action of the gate 19 so that the only path for the signals from the first receiver will be through the half-wave rectifier 51 and the gate 18 to initiate the operation of the precision sweep generator. The amplitude selector 52 may be provided to prevent the operation of the precision sweep generator in response to noise signals of a value less than, for example, 1 volt. Where the noise level is extremely low or absent, the amplitude selector 52 need not be used.

The output from the second receiver R2 is amplified to a level substantially greater than the output from the first receiver R1, for example, a magnitude greater than 10 volts. As illustrated, with such great amplification the later occurring pulses will be of a value substantially greater than 30 volts and may even exceed the value or level of the synchronizing pulse A. In order to prevent the later arriving pulses from the second receiver from passing through the amplitude selector 43, limiter 60 is employed to limit the output from the second receiver to a level of 20 volts. The onset or first pulse C' from the second receiver R2 is then applied to trigger the blocking oscillator 63 by way of a path including the coupling network 40, coupling network 42, half-wave rectifier 61, gate 19, and the amplitude selector 62. The output signal from the blocking oscillator 63 causes the switch and condenser unit 17 to sample the magnitude of signal from the precision sweep generator 16.

The amplitude selector 62 is preset so that it will pass only those pulses whose value exceeds, for example, 10 volts. Or more generally, it may be stated that the amplitude selector 62 will only pass pulses whose amplitude exceeds the limited level of signals produced from the first receiver R1. Thus, the amplitude selector 62 will prevent response of the blocking oscillator 63 and the switch and condenser unit 17 to pulses generated by the first receiver R1. It will be noted from the study of the waveforms of FIG. 2 that the wave signal B produced by the first receiver persists over a period of time which extends to and beyond the time period $t_2$. Thus, in the absence of the amplitude selector 62, one of the pulses comprising the waveform B occurring in time after the onset or first pulse B' would be effective to trigger blocking oscillator 63 and operate the switch and condenser arrangement 17.

Accordingly, it is possible through the use of the present invention to operate a two-receiver continuous velocity logging system wherein the signals from the transmitter and the two receivers are applied over a single wire transmission circuit without the need of downhole switching of the receivers as heretofore practiced in the art.

Figure 3:
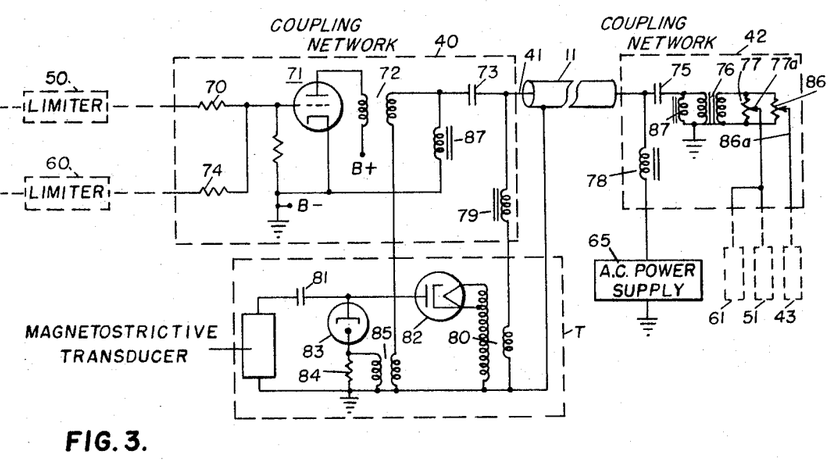
FIG. 3 schematically illustrates the coupling networks of FIG. 1.

Referring now to FIG. 3, there is schematically illustrated a circuit disclosing forms of coupling networks suitable for use in the practice of the present invention. Signals from the first receiver R1 passing through the limiter 50 are applied by way of coupling resistor 70 to the input of an amplifier stage 71 whose output is coupled by way of transformer 72 and condenser 73 to the conductor 41 of the cable 11. Likewise, the output from the second receiver R2 passing by way of limiter 60 is applied by way of coupling resistor 74 to the same input of the amplifier stage 71.

The signals from the receivers coupled in the coupling network 40 are applied to the uphole coupling network 42. More particularly, the signals pass by way of a high pass coupling capacitor 75 and a transformer 76 to the potentiometer 77. They are picked off by the movable contact 77a and applied to the half-wave rectifiers 51 and 61 for operation of the time interval measuring devices as above-described.

Power for operation of the transmitter T is applied from the power supply 65 by way of reactance 78 to the cable 11. The reactance 78, illustrated as an inductance or choke, operates as a low impedance for low frequency power, which is usually 60 cycles, and a high impedance to the high frequency of the signals generated by the receivers. The 60 cycle power is blocked from the transformer 76 by the high pass capacitor 75. The low frequency power is applied to transmitter T from the conductor 41 by way of low pass reactance or choke 79 to the primary winding of a transformer 80. The transmitter T is of the type described and claimed in U.S. Patent 2,747,639 to Summers et al. It is a free running transmitter whose operation briefly is as follows. Capacitor 81 in the plate cathode circuit of diode 82 is initially in a discharged state. The AC power from the source 65 is applied by way of transformer 80 through the rectifier 82 to charge the capacitor 81. When the voltage on the capacitor 81 reaches a predetermined value, tube 83, which is a spark gap tube of the 1B22 type, breaks down. Current now flows through the tube 83 and through the magnetostrictive transducer to produce an acoustic pulse which is ultimately detected by the receivers R1 and R2 after travel through the earth structure adjacent the borehole. The capacitor is again charged and the operation is repeated.

Each time the capacitor discharges through the tube 83 and through the resistor 84 there is produced in the primary winding of transformer 85 a pulse which is the synchronizing pulse A of FIG. 2. This pulse, a high frequency pulse, then travels from the secondary of the transformer 85, through the secondary of transformer 72, and thence by way of capacitor 73 over the transmission line 11 to the coupling network 42. The pulse is reproduced in the potentiometer 86 and is applied by way of movable contact 86a to the amplitude selector 43.

An impedance 87, illustrated as a choke, provides a low impedance path to ground for any 60 cycle or low frequency power signal appearing between the transformer 72 and the capacitor 73. It also provides a high impedance to the high frequency signals from the receivers and the synchronizing pulse from the transmitter for development of signals to be transmitted uphole. The capacitor 73 provides a low impedance to the high frequency signals aforementioned and a high impedance to the current flowing from the AC power supply 65.

In the uphole coupling network, the capacitor 75 provides a blocking action with respect to the low frequency power from the power supply 65. The inductance 87 across the primary of transformer 76 provides a low impedance path effectively short circuiting any low frequency, for example, the 60 cycle signal or power from the AC power supply 65 which may pass the blocking condenser 75.

In one embodiment, the capacitive and inductive components of a circiut of FIG. 3 have the following values. Inductors or chokes 78, 79 and 87 have a value of 0.005 henries and the capacitors 73 and 75 have a value of 8 microfarads.

Figure 4:
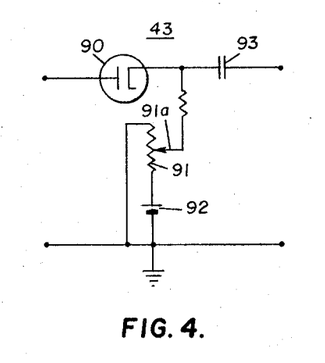
FIG. 4 illustrates one form of amplitude selector.

Many forms of amplitude selectors may be employed in the practice of the present invention. One suitable form of amplitude selector is illustrated in FIG. 4. It is similar to those illustrated and described in Waveforms by Chance et al. at page 329. The amplitude selector 43 (FIG. 4) includes a diode 90 whose cathode is normally made positive with respect to the plate. The positive bias is provided by a network including the potentiometer 91 energized by battery 92. The signal level to be passed by the diode 90 is determined by positioning of the movable contact 91a of the potentiometer 91. Accordingly, only signals above the predetermined level pass through the diode 90 and the coupling capacitor 93. These signals will be of a level greater than that set by the biasing network. All signals of a lower magnitude or level will be blocked by the diode 90.

While the circuit of FIG. 1 discloses the use of a separate amplitude selector, for example, that shown in FIG. 4, it will be understood that the same selection or blocking function may be provided in other and considered equivalent means. For example, the multivibrators and the blocking oscillators may be provided with biasing circuits to set a level at their inputs which must be exceeded by the input signal before the blocking oscillator or the multivibrators will respond.

Now that the invention has been described in a form in which the crossfeed is 100 percent, it will be obvious to those skilled in the art that the invention is equally applicable to those situations where the crossfeed between signals from the receivers will be less than 100 percent. Such a modification is illustrated in FIG. 5.

Figures 5, 6, 8, 9:
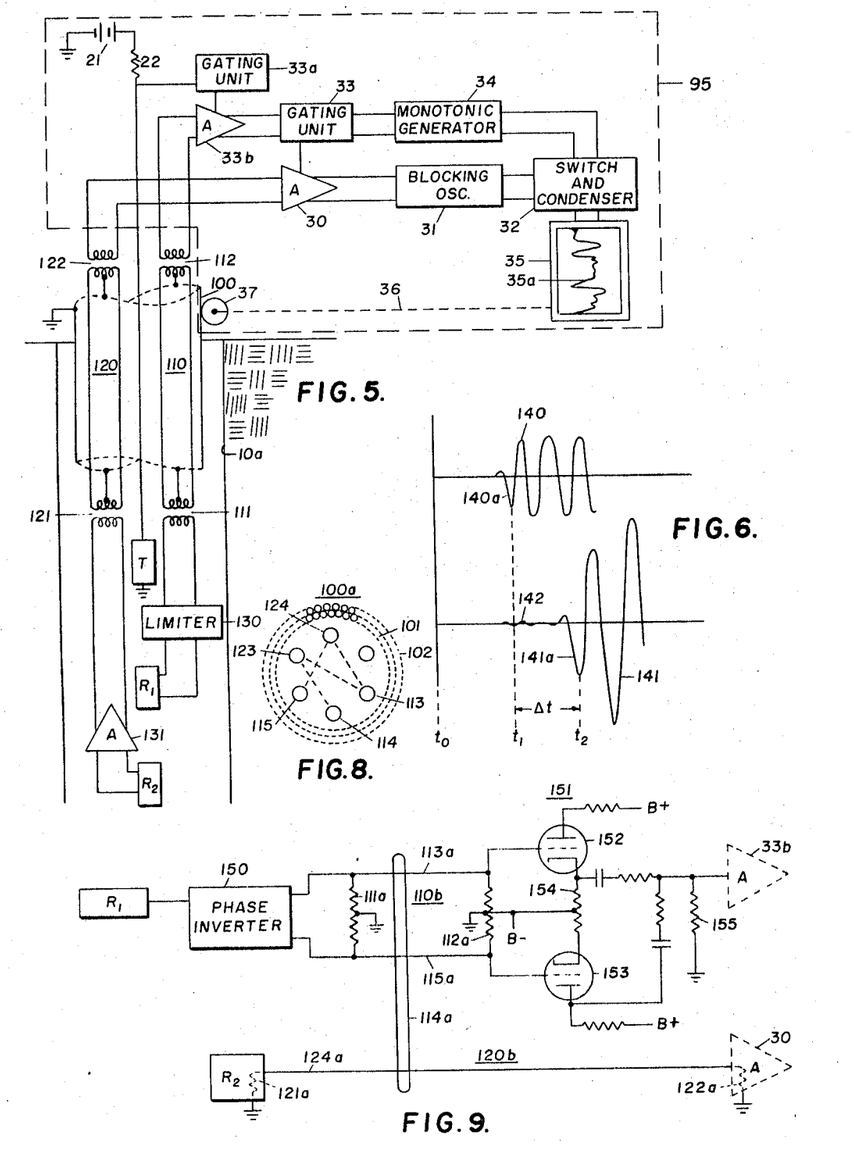
FIG. 5 illustrates a modification of the present invention embodied in a continuous velocity logging system.
FIG. 6 is an explanatory figure illustrating detector waveforms.
FIG. 8 is a cross section through a typical multi-conductor logging cable.
FIG. 9 is a modification of the embodiment of FIG. 7.

In the embodiment of FIG. 5, the modification referred to will be described in conjunction with a velocity logging system of the type described and claimed in U.S. Patent 2,704,364 to Gerald C. Summers. Reference may be had to that patent for a complete description of the operation of the recording system which is shown in FIG. 4 of that patent. For convenience, the reference characters within the block 95 are the same as the reference characters of the patent. Briefly, the operation of the system is as follows. The transmitter T is energized from a source of supply 21 illustrated as a battery. When an acoustic pulse is generated by the transmitter T, a signal is generated across the resistor 22. This signal operates a gating unit 33a which is effective to remove a cutoff bias normally rendering the amplifier 33b inoperative. When the acoustic pulse appears at the receiver or detector R1, a signal is produced and applied by way of cable 100 and the amplifier 33b to a second gating unit 33 to initiate the operation of a monotonic generator 34. While the monotonic function produced by this generator may take any form, as defined in the aforementioned patent, it is usually in the form of a linearly increasing voltage beginning at a time $t_1$ (FIG. 6) corresponding with the signal first receiver R1. The precision generator 16 of FIG. 1 may be the same as the monotonic generator 34 of the aforementioned patent. The amplifier 30 is then turned on by operation of the gating unit 33. Thereafter, signals generated by the receiver R2 in re sponse to receipt of the acoustic pulse are applied by way of the amplifier 30 to operate the blocking oscillator 31. The pulse from the blocking oscillator triggers a switch and condenser unit 32 which is the same as the arrangement 17 of FIG. 1 and which is effective to sample at time $t_2$ the instantaneous magnitude of the monotonic function. This sampled magnitude is then applied to a recorder 35 where the line 35a represents the elapsed time $\Delta t$ between the arrival of the acoustic pulse at the first receiver and at the second receiver. As is common practice in the well logging art, the recorder 35 may be driven by way of a coupling 36 actuated or controlled by a pulley 37 adjacent the cable 100 whereby movement of the associated recording chart will be directly proportional to the movement of the transmitter T and the receivers R1 and R2 in the borehole 10a.

It is evident that in the simplified form of logging system contained within the block 95 signals from the first receiver R1 crossfed into transmission circuit 120 associated with the second receiver R2 may be applied by way of the amplifier 30 to produce a false operation of the switch and condenser unit 32.

In accordance with the present invention, such false operation is prevented by effectively increasing the signal level from the second receiver R2 so that the signal from the reeciver appearing on the transmission circiut 120 will be substantially greater than any signals appearing in that circuit due to crossfeed effects from circuit 110 associated with receiver R1. Now, by rendering the blocking oscillator 31 responsive to signals of only a predetermined magnitude, which is equivalent to employing an amplitude selector like the selector 62 of FIG. 1, it is evident that despite significant crossfeed signals from the transmission circuit 110 to the transmission circuit 120, the switching and condenser unit 32 will be conditioned to respond only to signals generated by the second receiver R2.

The signals from the first receiver R1 are limited to a predetermined level, for example, 2 volts, by the action of the limiter 130. These signals are applied by way of coupling means or transformer 111 connected to the downhole end of the transmission line or circuit 110, thence by way of the conductors of the transmission circuit 110 to an uphole coupling means or transformer 112 connected to one end or uphole end of the line 110 and thence to the input of the amplifier 33b. The output from the second receiver R2 is increased to a value susbtantially greater than the limited level of the output of the first receiver by an amplifier 131. The output from the amplifier 131 is applied to the input of the uphole amplifier 30 by way of a circuit which may be traced by way of a downhole coupling means or transformer 121 connected to the downhole end of the line 110, the conductors comprising the transmission line 120 and an uphole coupling means or transformer 122 which is connected to one end, the uphole end of the line 110.

It will be observed that in the present embodiment an amplitude selector has been omitted from the synchronizing circuit which conditions the interval measuring circuit for response to the signals from the receivers. An equivalent signal blocking operation may be provided by rendering the time interval of operation of the gating unit 33a much longer than the time interval between the production of the synchronizing pulse and the production of the signal from the second receiver. In this manner, any signals from the second receiver that are crossfed to the input of the gating unit 33a will be ineffective to interfere with the operation thereof.

Where a multiconductor cable is being employed to transmit singals from the receivers to the surface equipment, a further improvement in operation may be made by reducing the effect of crossfeed between the transmission circuits. More particularly, in the modification now to be described the signals crossfed into the transmission circuits are effectively canceled within the transmission circuits themselves, thus rendering more effective the operation of the amplitude selective circiuts in the uphole measuring equipment.

Figure 7:
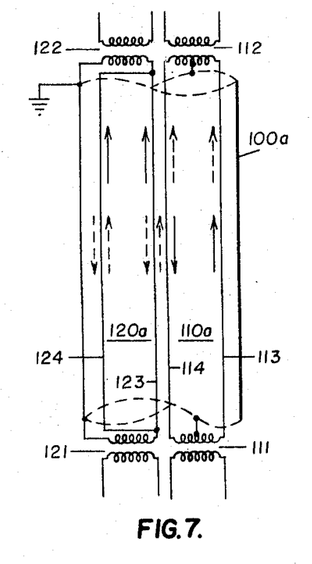
FIG. 7 illustrates nonsymmetric transmission line connections for practice of another form of the present invention.
Figure 10:
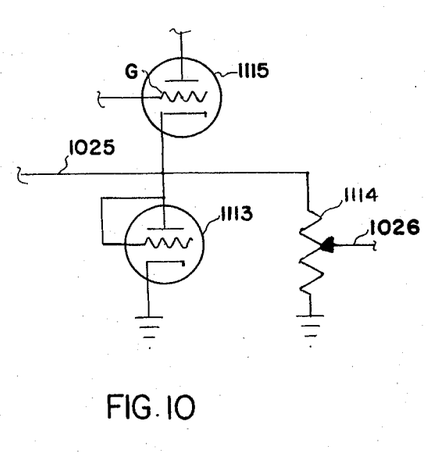

This modification is shown in FIG. 7 in which the transmission line 110a associated with the first receiver R1 is shown balanced to ground. A second transmission circuit 120a associated with the second receiver R2 is connected in parallel to ground. The effect of these two different types of transmission circuits is to cause the cancellation in the first transmission circuit 110a of any signals induced from the second transmission circuit 120a and likewise the cancellation in the second transmission circuit 120a of any signals induced from the first transmission circuit 110a.

The transmission circuit 110a associated with the first receiver R1 is comprised at the downhole portion of a coupling means or impedance shown as transformer 111 whose primary is connected to the output of receiver R1. The opposite ends of the secondary winding of transformer 111 are connected to conductors 113 and 114 which, in turn, are connected at their opposite ends to the primary winding of the uphole transformer 112. The secondary winding of the transformer 112 is connected to the input of the amplifier 33b. The secondary winding of the transformer 111 and the primary winding ow the transformer 112 are center-tapped to ground. This connection is repersented by the shield 100a which is normally provided for logging cables.

The second transmitting circuit 120a associated with the second receiver R2 is comprised of a coupling means or impedance shown as transformer 121 whose primary winding is coupled to the output of the receiver R2. The secondary winding of the transformer 121 has one end connected to the cable shield 100a which is a ground connection. An opposite end of the secondary of transformer 121 is conected by way of conductors 123 and 124 to one end of the primary winding of an uphole coupling means or impedance shown as transformer 122. The opposite end of the uphole primary winding is connected to the shield 100a. The secondary winding of the transformer 122 is connected to the input of the amplifier 30. This second circuit may be defined as one in which two conductors comprising it are connected in parallel to ground. With these connections, nonsymmetric circiuts are provided so that currents induced in the transmission circuit 110a from the transmission circuit 120a will be canceled and vice versa.

The cancellation of induced currents may be demonstrated by considering the current flows, both the currents produced directly from the receivers and the induced currents. The directions of currents produced directly from the receivers have been shown alongside the conductors as arrows drawn with solid lines; whereas, the induced current flows have been illustrated by arrows drawn with dashes. The current from the first receiver in transmission circuit 110a is shown traveling in one direction in conductor 113 and in an opposite direction in conductor 114. These currents induced into the conductors 123 and 124 of the second transmission circuit 120a flow in opposite directions. Accordingly, the signals or currents induced into the second transmission circuit will cancel out and there will be a substantially zero current flow in the second transmitting circuit due to induced signals.

Similarly, signals or currents induced in the first transmitting circuit 110a from the second transmitting circuit 120a will be canceled out. It will be observed that the current flow in conductors 123 and 124 are in the same direction; the return path being ground. Therefore, the currents induced in conductors 113 and 114 will also be in the same direction. These currents will oppose each other in the primary winding of transformer 112 and in the secondary winding of transformer 111. The result is a cancellation of induced or crosstalk signals.

The effectiveness of the transmission circuits of the present invention in reducing crosstalk is illustrated in FIG. 6. Waveform 140 represents the signal generated by the first receiver R1, and waveform 141 represents the waveform generated by the second receiver R2. These waveforms have been duplicated from an oscillographic record made of the waveforms generated by an acoustic velocity logging system embodying the present invention. In FIG. 6, the time $t_0$ represents the instant of generation of an acoustic pulse by the transmitter T. At time $t_1$, there is transmitted to the surface recording equipment a pulse 140a of waveform 140 to which the monotonic generator 34 (FIG. 5) responds to begin production of the monotonic function. A time interval $\Delta t$ later, and more specifically at time $t_2$, the pulse 141a is received uphole from the second receiver and the switch and condenser are operated to produce a signal proportional to the time interval $\Delta t$. It will be observed that the waveform 141 does include, during the time interval $\Delta t$, some crosstalk from the waveform 140. This crosstalk 142 is of a very low amplitude and usually not discernible. It appears in emphasized form in the drawing for the purpose of illustrating its relation to the direct signal 141.

A system which includes the modification of FIG. 7, but one in which the limiter 130 and the amplifier 131 of FIG. 5 are omitted, provides satisfactory results. However, with the limiter 130 and the amplifier 131 included together with the modification of FIG. 7, the crosstalk signal 142 of FIG. 6 will not be discernible due to the limiting action provided by the limiter 130 and as evidenced by the effect of limiting upon the waveform 140.

The use of two conductors 123 and 124 for the transmission line circuit 120a will be desired in those instances where there is unequal coupling between conductors 123, 124, and 113, 114. Where one conductor has equal coupling with two other conductors, the transmission circuit 120a can consist of the one conductor. These conditions are illustrated in FIG. 8 which is a cross section of a typical logging cable now in use. Such a cable 100a is comprised of 6 signal conductors including the conductors 113, 114, 115, 123, and 124. The outer portion of the cable is formed by two oppositely wound shields 101 and 102. Where the conductors 113 and 114 have been selected for the transmission circuit 110a and have the physical position illustrated in FIG. 8, it will be desired to use the two conductors 123 and 124 for the transmission circuit 120a. This is by reason of the fact that a single conductor 123 will not have the same coupling with conductor 113 that it will with the conductor 114; the distance between conductor 123 and conductor 113 being greater than the distance between conductor 123 and conductor 114, as noted by the dashed lines, the coupling between conductor 123 and conductor 113 will be less than the coupling between conductor 123 and conductor 114. As a result, there would remain in circuit 120a an uncanceled component of induced current. By employing the second conductor 124, the total coupling between the conductors 113, 114 and 123, 124 is effectively made substantially equal and, therefore, the induced signal is substantially reduced to zero.

On the other hand, should the transmission circuit 110a (FIG. 7) be comprised of conductors 113, 115, there is a conductor in the cable which is equally spaced from both these conductors as noted by the dashed lines. This is the conductor 124. Accordingly, the conductor 123 need not be used and effective cancellation of induced currents will take place in the single conductor 124.

In FIG. 7, the coupling means or impedances 111, 112, 121, and 122 have been illustrated as coupling transformers. Transformers are preferred because of ease of impedance matching; however, it will be understood that other forms of impedances may be employed and that the transmission circuit of FIG. 7 may be modified within the scope of the present invention. Such modification is illustrated in FIG. 9 in which it will be assumed that the conductors selected for the transmission circuits are symmetrically disposed in the cable and, therefore, one of the transmission lines need be comprised of only one conductor, the conductor 124. In the circuit of FIG. 9, signals from the first receiver R1 are applied to a phase inverter 150. The phase inverter may be of any well-known type. For example, see those illustrated in FIG. 11, pages 3–22 of Principles of Radar by the M.I.T. Radar School Staff, published by McGraw-Hill Book Company, Inc. The output of the phase inverter circuit is applied to the first transmission circuit 110b comprised of a loop formed by a pair of impedances 111a and 112a and the pair of conductors 113a and 115a alternately connected in series.

The impedances 111a and 112a, illustrated as resistors, are center-tapped to ground. The voltages produced across the divided sections of the impedance 112a are applied to inputs of a push-pull stage 151 including tubes 152 and 153. The output signal from the tube 152 is derived across a cathode resistor 154, and the output from the tube 153 is derived from its plate circuit. These signals, by reason of the selection of outputs, are of like phase and are added across the impedance 155. The combined signal is then applied to the input of the amplifier 33b.

The output signal from the second receiver R2 is developed across an impedance 121a which is shown in dotted lines symbolizing the output impedence of the receiver circuit. One end of the impedance 121a is connected to ground. At a point remote from ground, the impedance 121a is connected to the conductor 124a whose opposite or uphole end terminates in a second impedance shown as a resistor 122a. The resistor 122a, shown in phantom, symbolizes the input impedance of the amplifier 30.

The currents flowing in conductors 113a, 115a, and 124a, included in cable 114a of FIG. 9, are the same as the directions of current flow in the like conductors of FIG. 7. Accordingly, the currents induced over the length of cable from one circuit are canceled in the other circuit.

Now that the principles of the invetnion have been explained, it will be understood that modifications may be made and certain parts may be used in place of other parts all within the scope of the appended claims.

What is claimed is:

1. In a well logging system having a transmitter and at least two receivers, a transmission line for transmitting electric signals from the receivers to the surface with negligible crossfeed and comprising a cable having a plurality of conductors, a first circuit for connection to one of the receivers and comprising a loop formed by a first pair of impedances and a pair of said conductors alternately connected in series, said impedances being center-tapped to ground, and a second circuit for connection to another of the receivers and including a second pair of imperances and at least another of said conductors, each of said impedances having one end connected to ground and at a point remote from said end being connected to said other of said conductors.

2. A system as in claim 1 in which said second circuit includes a pair of conductors connected in parallel to said remote points of said second-named pair of impedances.

3. A system as in claim 1 in which said first- and said second-named impedances are transformer windings.

4. A system as in claim 1 in which said first pair of impedances are resistors, and further comprising a phase inverter connected in circuit between said one of said receivers and one of said first pair of resistors for producing from the electric signal of said one of said receivers and at opposite end of said resistor signals of opposite phase, a push-pull amplifier stage connected across the second of said first pair of resistors and to which said signals of opposite phase are to be applied, and network electrically connected to the push-pull output of said amplifier stage for adding the output signals from said amplifier stage.

5. In a well logging system having a transmitter and at least two receivers, a transmission line for transmitting electric signals from the detectors to the surface with negligible crossfeed and comprising a cable having a plurality of conductors, a first circuit for connection to one of the receivers and including a pair of transformer windings and a pair of said conductors alternately connected in series, said transformer windings being center-tapped to ground, and a second circuit for connection to another of the receivers and including a second pair of transformer windings and a second pair of said conductors, each of said second pair of transformer windings having one end connected to ground, said second pair of conductors being connected in parallel to points on said transformer windings remote from the ground connections.

6. In an acoustic velocity well logging system having a downhole transmitter and first and second downhole receivers and a time interval measuring means uphole for measuring the time interval between the receipt of a transmitter-generated acoustic pulse by the first receiver and the receipt of the same pulse by the second receiver, and in which the time interval measuring means includes means responsive to signals from the first receiver for starting the measurement of the time interval and means responsive to signals from the second receiver for ending the measurement of the time interval, a transmission line having one end for electrical connection to the measuring means and having a downhole end for electrical connection to the receivers for transmitting to the measuring means electric signals from the receivers produced in response to the arrival of the acoustic pulse, a limiter connected in circuit between a first of the receivers and the downhole end of said transmission line for limiting the magnitude of the signal applied to the transmission line by the first receiver, an amplifying means connected in circuit between the second receiver and the downhole end of said transmission line for increasing the signal from the second receiver to a level substantially above that of the limited level of signal from the first receiver, means in circuit between said one end of said transmission line and the measuring means for applying first receiver signals to the starting means, and an amplitude selective means uphole in circuit between said one end of said transmission line and the measuring means for blocking the first-receiver signal from and for applying the second-receiver signal to the measurement ending means of the measuring means.

7. A system as in claim 6 in which said transmission line comprises a cable having at least one conductor and in which said signals from the receivers are transmitted to the measuring means over said one conductor.

8. A system as in claim 6 in which said transmission line comprises a cable having at least two conductors and said signals from said receivers are transmitted to the measuring means over different ones of said conductors.

9. In an acoustic velocity well logging system having a downhole transmitter and first and second downhole receivers and a time interval measuring means uphole for measuring the time interval between the receipt of a transmitter-generated acoustic pulse by the first receiver and the receipt of the same pulse by the second receiver, and in which the time interval measuring means includes means responsive to signals from the first receiver for starting the measurement of the time interval and means for response to signals from the second receiver for ending the time interval, a transmission line having an uphole end and a downhole end for transmitting to the measuring means electric signals from the receivers produced in response to the arrival of the acoustic pulse, a first coupling network electrically interconnecting the measuring means to the uphole end of said transmission line, a second coupling network electrically interconnecting the receivers and the downhole end of said transmission line, a limiter connected in circuit between a first of the receivers and the downhole end of said transmission line for limiting the magnitude of the signal applied to the transmission line by the first receiver, an amplifying means connected in circuit between the second receiver and the downhole end of said transmission line for increasing the signal from the second receiver to a level substantially above that of the limited level of signal from the first receiver, means in circuit between said one end of said transmission line and the measuring means including an amplitude selective means for applying first-receiver signals to the starting means and for blocking the first-receiver signal from and for applying the second-receiver signal to the interval ending means of the measuring means.

10. A system as in claim 9 in which said transmission line comprises a cable having at least one conductor and in which said signals from the receivers are transmitted to the measuring means over said one conductor.

11. A system as in claim 10 in which power means to actuate the transmitter is located uphole and is electrically connected to said first coupling network for transmission of power over said one conductor to the downhole transmitter.

12. In an acoustic velocity well logging system having a downhole transmitter and two receivers and a time interval measuring means uphole for measuring the time elapsed between the receipt of a transmitter-generated acoustic pulse by the first receiver and the receipt of the same pulse by the second receiver and in which said time interval measuring means is conditioned for measuring the time interval upon receipt of of a synchronizing pulse from the transmitter generated coincident with the generation of the acoustic pulse and further in which the measuring means has three channels, a conditioning channel for receipt of the synchronizing pulse, a start channel for receipt of the first-receiver signal and a stop channel for receipt of the second-receiver signal, a transmission line having one end for electrical connection to the measuring means and having a downhole end for electrical connection to the receivers and to the transmitter for transmitting to the measuring means the synchronizing pulse from the transmitter in response to the generation of the acoustic pulse and signals from the receivers produced in response to the arrival of the acoustic pulse, a limiter connected in circuit between a first of the receivers and the downhole end of said transmission line for limiting the magnitude of the signal applied to the transmission line by the first receiver, an amplifying means connected in circuit between the second receiver and the downhole end of said transmission line for increasing the signal from the second receiver to a level substantially above that of the limited level from the first receiver, a second limiter connected in circuit between said amplifier and said downhole end of said transmission line for limiting the magnitude of the signal applied to the transmission line by the second receiver to a level substantially less than the level of the synchronizing pulse, and circuit means including an amplitude selective circuit electrically connected between said one end of said transmission line and said measuring means for selectively applying said pulse and said signals to their respective channels of the time interval measuring means.

13. In an acoustic velocity well logging system having a downhole transmitter and two receivers and a time interval measuring means uphole for measuring the time elapsed between the receipt of a transmitter-generated acoustic pulse by the first receiver and the receipt of the same pulse by the second receiver, and in which the measuring means has first and second channels, a transmission line having one end for electrical connection to the measuring means and having a downhole end for connection to the receivers for transmission to the measuring means of electric signals from the receivers produced in response to the arrival of the acoustic pulse, said transmission line comprising a cable having a plurality of conductors, a first circuit for connection to one of the receivers and comprising a loop formed by a first pair of impedances and a pair of said conductors alternately connected in series, said impedances being center-tapped to ground, and a second circuit for connection to another of the receivers and including a second pair of impedances and at least another of said conductors, each of said impedances having one end connected to ground and at a point remote from said end being connected to said other of said conductors, a limiter connected in circuit between a first of the receivers and the downhole end of one of said circuits for limiting the magnitude of the signal applied to the transmission line by the first receiver, an amplifying means connected in circuit between the second receiver and the downhole end of the other of said circuits for increasing the signal from the second receiver to a level substantially above that of the limited level from the first receiver, means uphole in circuit between said one end of said transmission line and the measuring means for applying the first-receiver signal to the first channel, and an amplitude selective means uphole in circuit between said one end of said transmission line and the measuring means for blocking the first-receiver signal from and for applying the second-receiver signal to the second channel of the measuring means.

14. In an acoustic velocity well logging system having a downhole transmitter and first and second downhole receivers and a time interval measuring means uphole for measuring the time interval between the receipt of a transmitter-generated acoustic pulse by the first receiver and the receipt of the same pulse by the second receiver, and in which the time interval measuring means includes means responsive to signals from the first receiver for starting the measurement of the time interval and means for response to signals from the second receiver for ending the time interval, a transmission line having one end for electrical connection to the measuring means and a downhole end for electrical connection to the receivers for transmitting to the measuring means electric signals from the receivers produced in response to the arrival of the acoustic pulse, circuit means connected in circuit between the output of one of said receivers and said downhole end of said transmission line for rendering the magnitude of the second-receiver signal larger than the magnitude of the first-receiver signal, means uphole in circuit between said one end of said transmission line and the measuring means for applying first-receiver signals to the starting means, and a magnitude responsive means uphole in circuit between said one end of said transmission line and the measuring means for blocking the first-receiver signal from and for applying the second-receiver signal to the interval ending means of the measuring means.

15. In an acoustic velocity well logging system having a downhole transmitter and two receivers and a time interval measuring means uphole for measuring the time elapsed between the receipt of a transmitter-generated acoustic pulse by the first receiver and the receipt of the same pulse by the second receiver, and in which the measuring means has first and second channels, a transmission line having one end for electrical connection to the measuring means and having a downhole end for connection to the receivers for transmission to the measuring means of electric signals from the receivers produced in response to the arrival of the acoustic pulse, said transmission line comprising a cable having a plurality of conductors, a first circuit for connection to one of the receivers and comprising a loop formed by a first pair of impedances and a pair of said conductors alternately connected in series, said impedances being center-tapped to ground, and a second circuit for connection to another of the receivers and including a second pair of impedances and at least another of said conductors, each of said impedances having one end connected to ground and at a point remote from said end being connected to said other of said conductors, a limiter connected in circuit between a first of the receivers and the downhole end of one of said circuits for limiting the magnitude of the signal applied to the transmission line by the first receiver, an amplifying means connected in circuit between the second receiver and the downhole end of the other of said circuits for increasing the signal from the second receiver to a level substantially above that of the limited level from the first receiver, and means uphole in circuit between said one end of said transmission line and the measuring means selectively for applying the first-receiver signal to the first channel and for applying the second-receiver signal to the second channel of the measuring means.

16. A system for determining an acoustical velocity through a subsurface formation traversed by a borehole comprising means including a first electric pulse producing means for transmitting an acoustic pulse through a subsurface formation between first and second spaced apart points in the borehole, means for producing second and third electric pulses upon the arrival of said acoustic pulse at said first and second points, respectively, a single transmission line, means for applying said first, second and third electric pulses to one end of said single transmission line, means coupled to said other end of said transmission line for deleting said first pulse and producing said second and third pulses at the output thereof, said pulse deleting means including an output, and means coupled to the output of said first pulse deleting means for measuring the time interval between said second and third electric pulses.

17. An acoustical velocity well logging system comprising an elongated tool adapted to be passed through the bore of a well, said tool having first, second and third transducers positioned in fixed spaced apart relationship in said tool, means for transmitting acoustic pulses at predetermined time intervals through a subsurface formation opposite said transducers, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, means defining a single electrical channel for transmitting said first, second and third electric pulses through the bore of the well, means coupled to the means defining said channel at a remote point from said tool for deleting one of said first, second and third electric pulses and a time measuring circuit coupled to the means defining said channel at a remote point from said tool for measuring the time interval between the remaining two pulses of said first, second and third pulses.

18. An acoustical velocity well logging system comprising an elongated tool adapted to be passed through the bore of a well, said tool having a transmitting transducer and first and second receiving transducers positioned in fixed spaced apart relationship in said tool, means for producing a first electric pulse for actuating said transmitting transducer to produce an acoustic pulse for passage through a subsurface formation from said transmitting transducer to said first receiving transducer and to said second receiving transducer, means for producing a second electric pulse upon the arrival of said acoustic pulse at said first receiving transducer, means for producing a third electric pulse on the arrival of said acoustic pulse at said second receiving transducer, a single conductor cable, means for applying said first, second and third electric pulses to one end of said single conductor cable, means coupled to said opposite end of said cable for deleting said first electric pulse, said pulse deleting means including an output, and a time measuring circuit coupled to the output of said first pulse deleting means for measuring the time interval between said second and third electric pulses.

References Cited

UNITED STATES PATENTS

| | | |
|---|---|---|
| 781,625 | 1/1905 | Stone. |
| 2,614,164 | 10/1952 | Huston _________ 33—178 X |
| 2,704,364 | 3/1955 | Summers _________ 181—.531 |
| 2,018,324 | 10/1935 | Schmidt _________ 333—12 |
| 2,278,177 | 3/1942 | Lacy _________ 333—12 |
| 2,191,121 | 2/1940 | Slichter _________ 181—.53 |
| 2,708,485 | 5/1955 | Vogel _________ 181—.53 |
| 2,931,455 | 4/1960 | Loofbourrow _______ 181—0.53 |
| 2,949,973 | 8/1960 | Broding et al. _______ 181—0.53 |
| Re. 24,446 | 3/1958 | Summers. |

RODNEY D. BENNETT, JR., Primary Examiner

D. C. KAUFMAN, Assistant Examiner

U.S. Cl. X.R.

174—34; 333—12; 340—15.5, 18